(12) United States Patent
Abdalla et al.

(10) Patent No.: US 8,216,470 B2
(45) Date of Patent: *Jul. 10, 2012

(54) MULTI-STAGE FILTER CARTRIDGE WITH POLYURETHANE ENDCAPS

(75) Inventors: Wassem Abdalla, Quimper (FR); Ricky England, Sparta, TN (US); Sainath R. Racha, Cookeville, TN (US); Eric R. Burgan, Baxter, TN (US); Jeffrey A. Husband, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 391 days.

This patent is subject to a terminal disclaimer.

(21) Appl. No.: 12/470,297

(22) Filed: May 21, 2009

(65) Prior Publication Data
US 2010/0294712 A1 Nov. 25, 2010

(51) Int. Cl.
*B01D 27/08* (2006.01)
*B01D 27/14* (2006.01)

(52) U.S. Cl. ...... 210/338; 210/342; 210/487; 210/493.2

(58) Field of Classification Search .................. 210/337, 210/338, 342, 487, 489, 493.2
See application file for complete search history.

(56) References Cited

U.S. PATENT DOCUMENTS

| | | | |
|---|---|---|---|
| 3,013,667 A * | 12/1961 | Jackson et al. ............. 210/487 | |
| 4,559,138 A | 12/1985 | Harms, II | |
| 4,909,937 A * | 3/1990 | Hoffmann et al. ............ 210/487 | |
| 5,556,440 A | 9/1996 | Mullins et al. | |
| 5,753,117 A | 5/1998 | Jiang | |
| 5,846,417 A | 12/1998 | Jiang et al. | |
| 5,868,932 A | 2/1999 | Guichaoua et al. | |
| 6,649,056 B2 * | 11/2003 | Fritze ............................ 210/489 |
| 6,884,349 B1 | 4/2005 | Jiang | |
| 7,458,468 B2 * | 12/2008 | Desmarais ................ 210/493.2 |
| 7,828,155 B2 * | 11/2010 | Proulx et al. ............... 210/493.2 |
| 7,867,387 B2 * | 1/2011 | Jiang et al. .................... 210/455 |
| 2006/0102549 A1 | 5/2006 | Wright | |
| 2006/0108277 A1 * | 5/2006 | Fall et al. ................... 210/493.2 |
| 2006/0124516 A1 * | 6/2006 | Merritt et al. ................. 210/338 |
| 2006/0278569 A1 * | 12/2006 | Meddock et al. ............. 210/338 |
| 2007/0090040 A1 * | 4/2007 | Bauder et al. ................. 210/338 |
| 2008/0041026 A1 | 2/2008 | Engel et al. | |
| 2009/0020465 A1 | 1/2009 | Jiang et al. | |
| 2009/0065425 A1 | 3/2009 | Jiang | |
| 2010/0294707 A1 * | 11/2010 | Abdalla et al. ................ 210/227 |
| 2011/0073538 A1 * | 3/2011 | Jiang et al. ..................... 210/234 |

OTHER PUBLICATIONS

International Search Report for application No. PCT/US2010/024983, dated Sep. 30, 2010 (3 pages).
Written Opinion of the International Searching Authority for application No. PCT/US2010/024983, dated Sep. 30, 2010 (4 pages).

* cited by examiner

*Primary Examiner* — Christopher Upton
(74) *Attorney, Agent, or Firm* — Hamre, Schumann, Mueller & Larson, P.C.

(57) ABSTRACT

A filter cartridge is described that is designed to accommodate for example dual stage filtration. The filter cartridge has an endplate structure formed of a heat cured material, such as polyurethane, where at least one of the top end and the bottom end of the outer filter and the inner filter are embedded within the heat cured material. The heat cured material can provide an endplate structure that is convenient for manufacture and that has one or more sealing surfaces to seal with a housing that the filter cartridge is assembled with. For example, the heat cured material of the endplate can seal non-filtered fluid from filtered fluid that has passed through each of the filtration stages available in the cartridge.

9 Claims, 5 Drawing Sheets

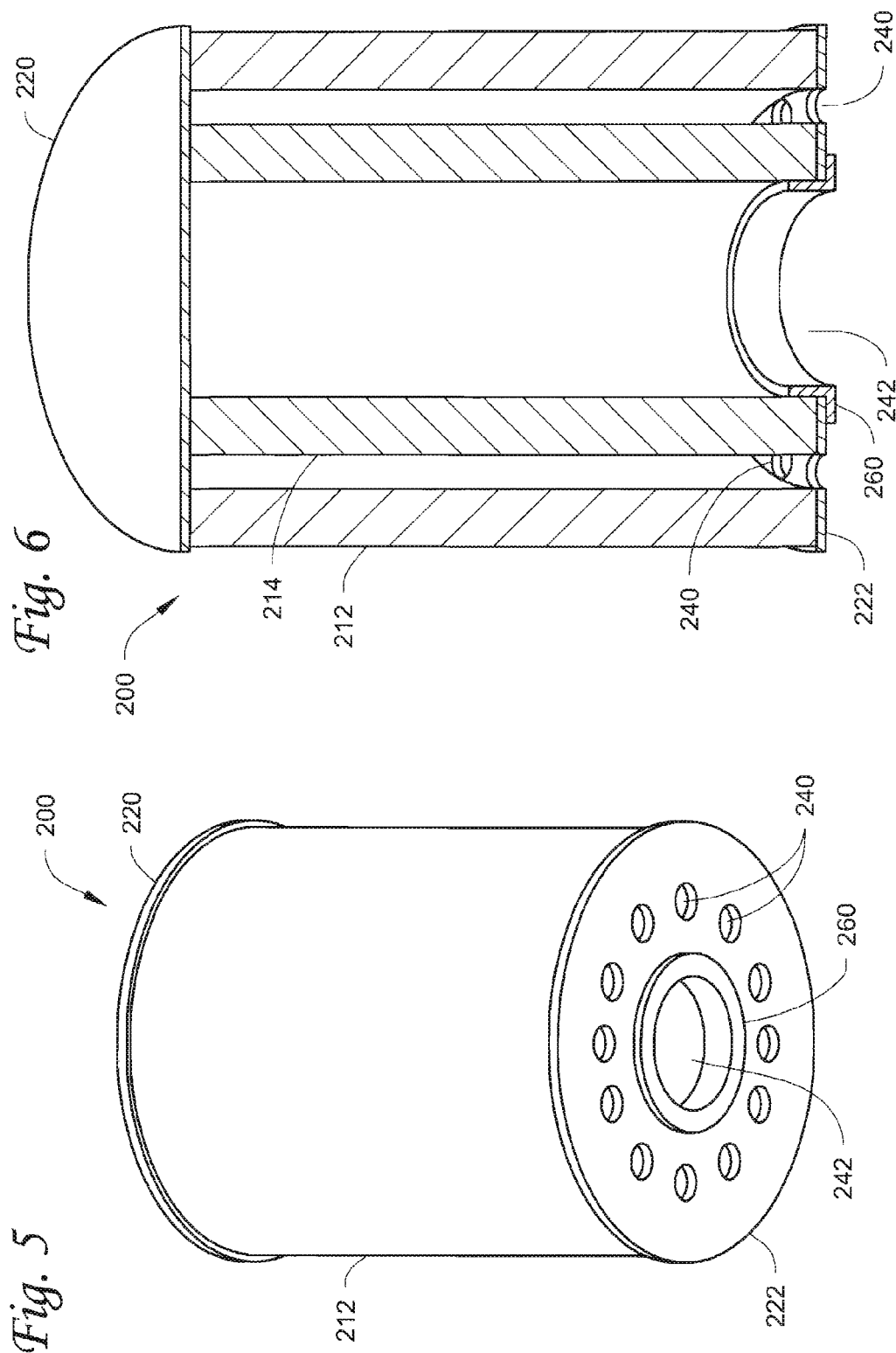

MULTI-STAGE FILTER CARTRIDGE WITH POLYURETHANE ENDCAPS

FIELD

This disclosure generally pertains to the field of filtration, and more particularly to a filter cartridge for dual stage filtration and having endplates formed of a heat cured material, for example polyurethane.

BACKGROUND

Filter cartridges are used in a number of different technologies to filter a fluid. The use of filter cartridges to filter fluids such as air, fuel, oil and other fluids is well known. Filter cartridges can be constructed with a single filter media, or with multiple filter media, for example as a dual stage (e.g. filter-in-filter) filter design that uses an inner filter media disposed inside of an outer filter media. A filter-in-filter design can provide a high particle filtration efficiency and high fuel/water separation through a wide range of fuel interfacial values. Such filter cartridges can include one or more filter media and endplates secured to the filter media at opposite ends.

Improvements may be made to such known filter cartridges, such as improvements in their assembly and seal construction for example in dual stage (e.g. filter-in-filter) filter applications.

SUMMARY

Generally, a filter cartridge is described that is designed to accommodate for example dual stage filtration, where the filter cartridge has an endplate structure formed of a heat cured material, such as polyurethane. The heat cured material can provide an endplate structure that is convenient for manufacture and that has one or more sealing surfaces to seal with a housing that the filter cartridge is assembled with. For example, the heat cured material of the endplate structure can seal non-filtered fluid from filtered fluid that has passed through each of the filtration stages available in the cartridge.

In one embodiment, a filter cartridge is provided that comprises an outer filter that includes a first filter media and has a central axis. An inner filter having a second filter media is arranged within the central axis of the outer filter, such that there is a space between an inner diameter of the outer filter and an outer diameter of the inner filter. The inner filter has an inner diameter with an opening adapted for inserting a filter housing standpipe therein. The outer filter and the inner filter have a first endplate structure on a top end of each of the outer filter and the inner filter, and have a second endplate structure on a bottom end of each of the outer filter and the inner filter. The second endplate structure has an opening in fluid communication with the space between the outer filter and the inner filter, and has an opening in fluid communication with the opening of the inner filter. At least one of the first endplate structure and the second endplate structure is a heat cured material formed onto the outer filter and the inner filter, such that at least one of the top end and the bottom end of the outer filter and the inner filter are embedded within the heat cured material.

In one embodiment, a method for forming an endplate structure for a filter cartridge comprises pouring a heat curing material into a mold. An end of an outer filter and an inner filter are embedded into the heat curing material by placing the end of the outer filter and the inner filter into the heat curing material, such that the inner filter is arranged within a central axis of the outer filter, such that there is a space between an inner diameter of the outer filter and an outer diameter of the inner filter, and such that the inner filter having an opening adapted for inserting a filter housing standpipe therein. The heat curing material with the outer filter and inner filter are then cured to form the endplate structure, where at least one of a top end and a bottom end of the outer filter and the inner filter is embedded therein.

BRIEF DESCRIPTION OF THE DRAWINGS

FIG. 5 is a bottom perspective of another embodiment of a filter cartridge.

FIG. 6 is sectional perspective view of the filter cartridge of FIG. 5.

DETAILED DESCRIPTION

Figure 1:
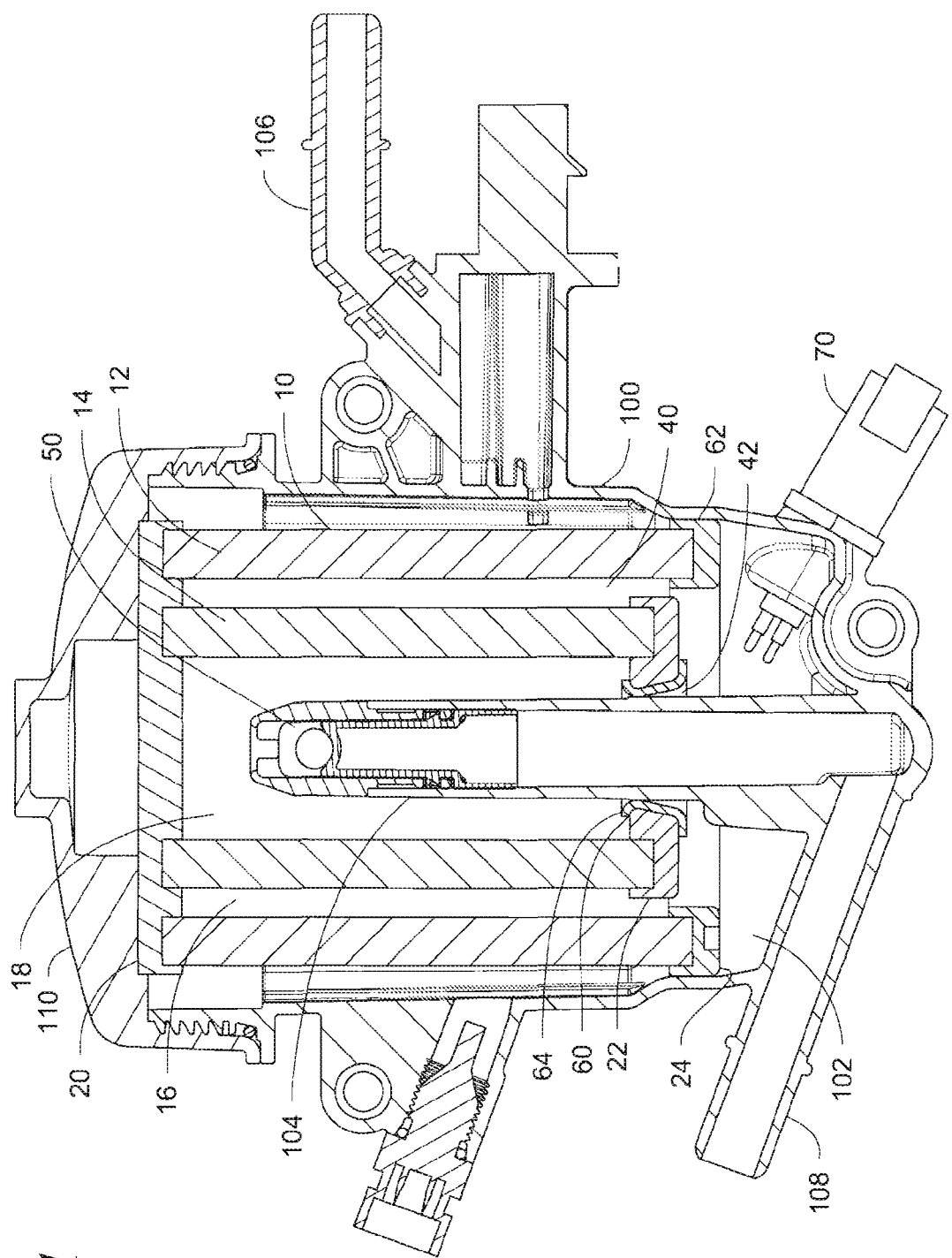
FIG. 1 is a sectional view of a filter cartridge according to one embodiment and installed in a filter housing.

With reference to FIGS. 1-4, a filter cartridge 10 according to one embodiment is illustrated. The filter cartridge 10 is designed to be installed in a filter housing 100 for filtering a liquid, for example diesel fuel, and removing water from the liquid. This description hereinafter describes the liquid as fuel. However, it is to be realized that the concepts described herein can be used for other liquids. In appropriate circumstances, the concepts described herein also can be used to remove contaminants other than water from the liquid. And, in appropriate circumstances, the concepts described herein can be used on filter cartridges that filter other types of fluids, for example air, oil and other fluids that can benefit from a filtration system. This description also describes the filter cartridge as a filter-in-filter design with first and second filter media. However, it is to be appreciated that the concepts herein can be used for any multistage filtration that may have more than two filter media or, in appropriate circumstances, single media filtration.

As shown in FIGS. 1-4, the filter cartridge 10 is of filter-in-filter construction including an outer filter 12 and an inner filter 14 concentrically arranged. In the embodiment shown, the cartridge 10 is designed for outside-in flow, with fuel entering the cartridge 10 from the outside and flows inwardly to the inside of the cartridge 10.

The outer filter 12 includes a first generally circular filter media 16 disposed around a central axis. The inner filter 14 includes a second generally circular filter media 18 with an inner diameter defining a generally open area. The filter media 16 and 18 may be composed of various materials and configurations as known in the art. For example, the filter media 16, 18 may be configured as a pleated structure, a chevron pleated structure, or as depth media and be made of paper-like or other fibrous material as known in art. It also will be appreciated that the outer filter 12 and the inner filter 14 may be constructed with center tubes such as known in the art to provide additional stability for the filters 12, 14.

As shown, the inner filter 14 is arranged within the central axis of the outer filter 12, such that there is a space 40 between an inner diameter of the outer filter 12 and an outer diameter of the inner filter 14. The generally open area of the inner filter 14 is receivable of a filter housing standpipe 104.

With further reference to the filter cartridge 10, the outer filter 12 and the inner filter 14 have a first endplate structure 20 on a top end of each of the outer filter 12 and the inner filter 14. The outer filter 12 and the inner filter 14 also have a second endplate structure 22, 24 on a bottom end of each of the outer filter 12 and the inner filter 14. As shown, the second endplate structure 22, 24 has an opening in fluid communication with the space 40 between the outer filter 12 and the inner filter 14, and has an opening 42 in fluid communication with the open area of the inner filter. The opening 42 as illustrated is generally circular in shape for fitting around a generally circular standpipe. However, the opening 42 could have other shapes as well for example oval, so as to fit around for example an oval standpipe.

At least one of the first endplate structure 20 and the second endplate structure 22, 24 is a heat cured material formed onto the outer filter 12 and the inner filter 14, such that at least one of the top end and the bottom end of the outer filter and the inner filter are embedded within the heat cured material. As some examples only, the heat cured material is polyurethane but may be other materials such as, but not limited to, an epoxy, a plastisol, other potted compounds, or mixtures thereof. Generally, the heat cured material is such that the resulting cured material has relative pliability, which may be appropriately used as sealing surfaces (discussed in detail below).

In the embodiment shown, both the first endplate structure 20 and the second endplate structure 22, 24 are formed of a heat cured material. For example, the first endplate structure 20 and the second endplate structure 22, 24 are formed of polyurethane so that the top end and the bottom end of each of the outer filter 12 and the inner filter 14 are embedded into the polyurethane. It will be appreciated that in some embodiments only one of the first endplate structure 20 and the second endplate structure 22, 24 is constructed of the heat cured material.

As further shown in FIGS. 1-4, the first endplate structure 20 is a single endplate on the top end of the outer filter 12 and the inner filter 14. It will be appreciated that the first endplate structure 20 may be one endplate for the top of the outer filter 12 and another endplate for the top of the inner filter 14.

Figure 3:
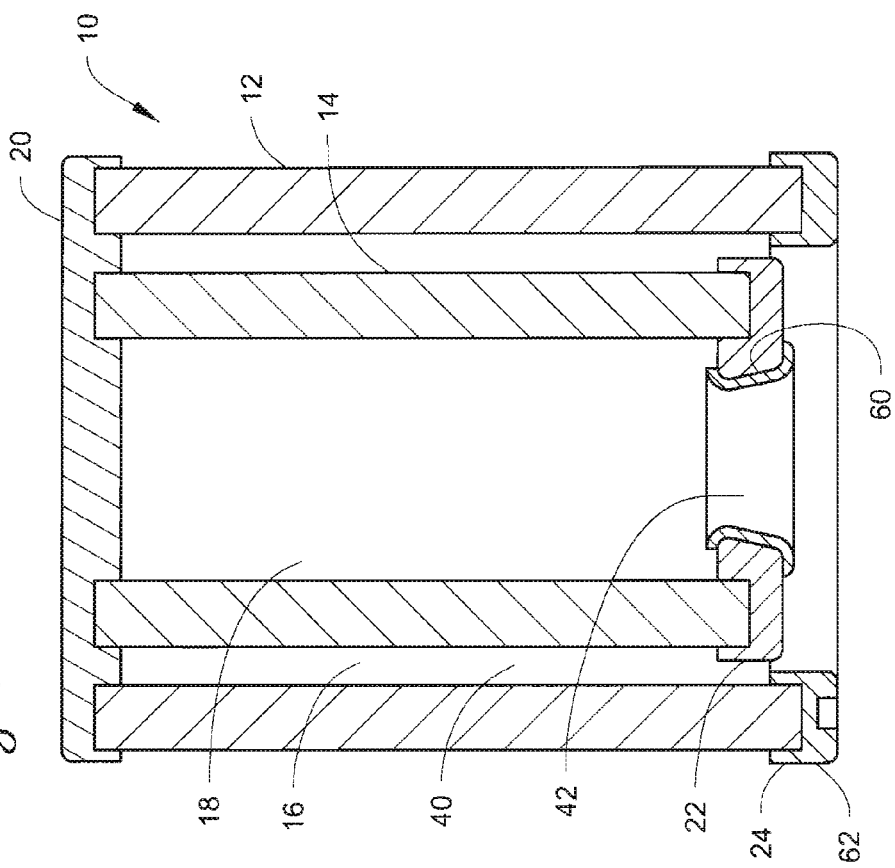
FIG. 3 is a sectional view of the filter cartridge showing inner and outer filters.
Figure 2:
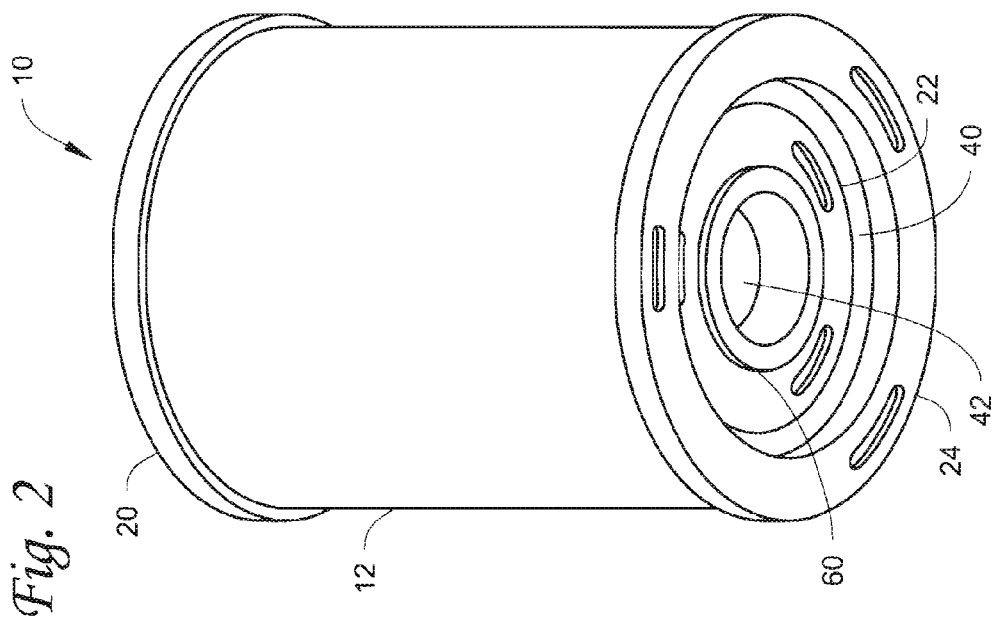
FIG. 2 is a perspective view of the filter cartridge removed from the filter housing.
Figure 4:
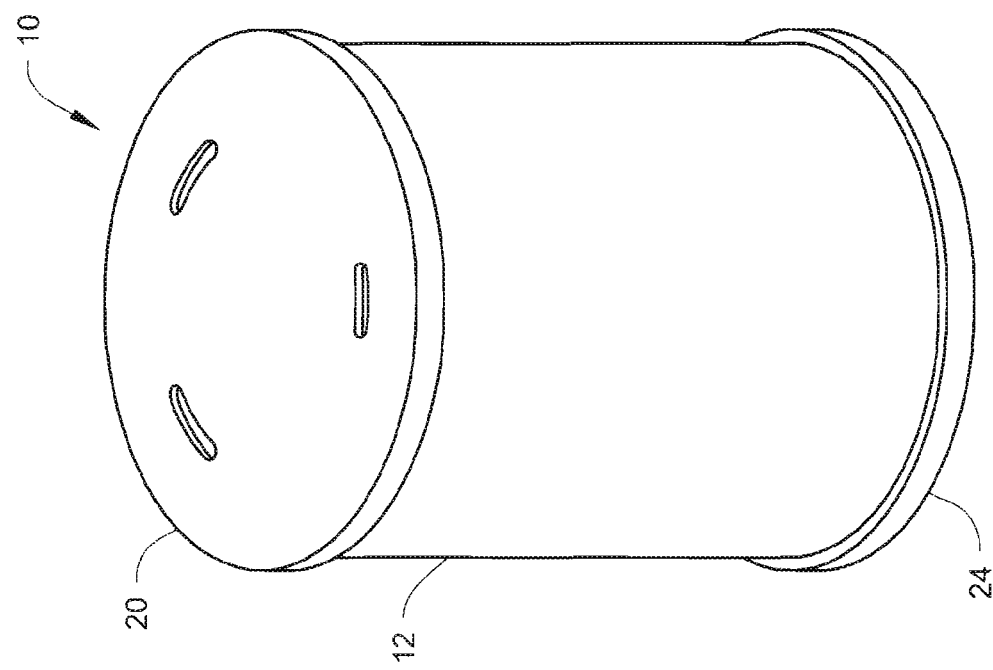
FIG. 4 is a top perspective view of the filter cartridge.

The second endplate structure 22, 24 illustrated in FIGS. 1-3 comprises one endplate 24 on the bottom of the outer filter 12 and another endplate 22 on the bottom of the inner filter 14. It will be appreciated, however, that the second endplate structure in other embodiments may be a single endplate on the bottom end of both the outer filter and the inner filter (see e.g. FIGS. 6 and 7 discussed in detail below).

The endplate 24 includes an outer sealing surface 62 on an outer diameter of the outer filter 12, and the endplate 22 includes an inner sealing surface 60 on the inner diameter of the inner filter 14. At least one of the sealing surfaces 60, 62 is the heat cured material itself. As shown in FIG. 1, for example, the outer sealing surface 62 seals with the inner surface of a filter assembly housing, for example housing 100. The outer sealing surface 62 keeps incoming fuel that has entered through the inlet 106 separated from water that has collected in the sump 102. Further, the inner sealing surface 60 seals with the outer surface of the standpipe 104. The inner sealing surface 60 keeps filtered fuel separated from fuel that has yet to pass the inner filter 14. With the relative durability and relative pliability of the heat cured material, the sealing surfaces 60, 62 can provide a suitable seal construction for the filter cartridge to eliminate the need for separately attached, assembled seal components.

In some embodiments, the inner sealing surface 60 further comprises an overmolded material 64 formed on the endplate 22. As shown in FIGS. 1-3, for example, the overmold material 64 is on an inner diameter of the endplate 22 defining the opening 42, and partially overlaps annular corners to the top and bottom sides. Where added sealing may be useful, such an overmold may be employed. As one example only, a thermoplastic material may be employed as the overmold material 64. It also will be appreciated that the endplate 24 may include an overmold material on the outer diameter thereof.

With further reference to FIGS. 1-3, the outer filter 12 and the inner filter 14 are not the same height. For example, the bottom of the inner filter 14 is shorter than the bottom of the outer filter 12. Generally, one of skill in the art can modify the height of the outer filter 12 and inner filter 14 as desired or necessary to accommodate various filter assembly housings and filtration needs. It will be appreciated that the outer filter 12 and the inner filter 14 can have substantially the same height from the top end to the bottom end. Likewise, the bottom of the inner filter 14 can be longer than the bottom of the outer filter 12. It also will be appreciated that the top end of the outer filter 12 and the inner filter 14 can have differing heights.

In use, the filter cartridge 10 is installed into the filter housing 100 as part of a filter assembly. As shown, the filter housing 100 is designed to receive the filter cartridge 10 therein for filtering the fluid. The filter housing 100 includes a side wall and an end wall that define a filter cartridge space large enough to receive the filter cartridge 10 therein, with the end wall forming a generally closed end around the standpipe 104. The housing 100 has an open end generally opposite the end wall and that can be closed by a lid 110. The housing 100 includes an inlet opening 106 through which fuel to be filtered enters the housing 100. An outlet 108 extends from the end wall of the housing 100. The outlet 108 is in fluid communication with the standpipe 104, through which fuel exits on its way to a protected system such as the engine (not shown). It is to be realized that the housing 100 could have other configurations than that illustrated by FIG. 1.

With further reference to the standpipe 104, the standpipe 104 is secured to the end wall and extends upwardly into the generally open space of the housing 100 toward the open end and the lid 110. In the illustrated embodiment, the standpipe 104 is generally hollow from its end connected to the end wall to a tip end thereof, thereby defining an internal flow passage. The flow passage is in communication with the outlet 108 so that fuel that enters the standpipe 104 can flow from the standpipe 104 through the outlet 108 and to the engine. As shown, the standpipe 104 is centered within the housing 100. In some embodiments, the standpipe 104 may be in an off-center position.

The filter assembly illustrated in the embodiment of FIG. 1 also shows a flow restriction valve 50 disposed at the tip end of the standpipe 104. It will be appreciated that the filter cartridge concepts described herein can be used with filter assemblies that do not use flow restriction valves. The flow restriction valve, when used, controls the flow of fuel into the standpipe 104. Flow restriction valves are known and are used to prevent fuel flow into a standpipe, such as when the filter cartridge is not installed or when an incorrect filter cartridge is installed. When the filter cartridge or other appropriately designed filter cartridge is installed, filter cartridges herein can be designed to interact with the valve in such a manner as to keep the valve from preventing fuel flow into the standpipe. An example of a valve operating in this manner is disclosed in U.S. Pat. No. 6,884,349 and in U.S. patent application Ser. No. 11/780,176. In some cases, the first endplate structure (e.g. top endplate 20) includes various activating structures to correctly open the flow restriction valve. It will be appreciated that the top endplate herein can be modified as known in the art, so as to accommodate a flow restriction valve if necessary.

When fuel enters the filter assembly for filtration, the fuel can include water therein in different forms, including free water, e.g. droplets, and emulsified water. Preferably, the first filter media 16 is designed so that free water is initially filtered when fuel enters the filter cartridge from the outside. The first filter media 16 can filter the free water and also coalesce the majority of the emulsified water, and separate the now coalesced water from the fuel. Water, being heavier than fuel, settles down to the bottom of the filter cartridge 10, and drains through the space 40 and opening between the bottom of the outer filter 12 and the inner filter 14. The water is collected in collection area 102 and can be monitored by a water-in-fuel sensor 70. By the time the fuel interfaces with the second filter media 18, most of the water has been separated, and the second filter media 18 performs a final filtration of the fuel before the fuel enters the center of the filter cartridge. The filtered fuel then enters the standpipe 104 and flows to the outlet 108, in a known manner, leading to a downstream protected component, for example a fuel pump (not shown).

With further reference to the filter media 16, 18, the outside of the second filter media 18 generally faces the interior of the first filter media 16. For outside to inside filtration, the inside of the second filter media 18 defines a clean or filtered fuel side of the filter cartridge 10, and the outside of the first filter media 16 defines a dirty or unfiltered fuel side. In appropriate circumstances, the concepts described herein can be applied to inside-out type flow filter cartridges.

With reference to FIGS. 5 and 6, another embodiment of a filter cartridge 200 is shown. Differently from the filter cartridge 10 of FIGS. 1-4, the filter cartridge 200 has a second endplate structure 222 that is a single endplate on the bottom end of both the outer filter 212 and the inner filter 214. Further, the outer filter 212 and the inner filter 214 are substantially the same height from the top end to the bottom end. As shown, the filter cartridge 200 also includes a single endplate for the first endplate structure 220 at the top of the outer filter 212 and the outer filter 214.

In the embodiment shown by FIGS. 5 and 6, the second endplate structure 222 includes an opening 242 in communication with the open area of the inner filter 214 and drain holes 240 (e.g. for water separation) and in communication with the space between the outer filter 212 and the inner filter 214. An overmold seal 260 is disposed on an inner diameter of the second endplate structure 222 which defines the opening 242. The overmold seal may be similarly constructed as the overmold seal 60 in FIGS. 1-4.

In some embodiments, the second endplate structure 222 is a plastic material and not a heat cured material such as polyurethane. It will be appreciated that depending on the mold used for the heat cured material, the second endplate structure 222 may also be a heat cured material formed with the necessary opening structure 240, 242.

With reference to FIGS. 7A-7D, different embodiments for inner sealing surfaces are shown. For example, where the second endplate structure employs a plastic endplate (see e.g. second endplate structure 222), rather than a heat cured material, the inner diameter defining the opening 242 can be modified with various support structures to accommodate different types of seal configurations.

Figure 7B:
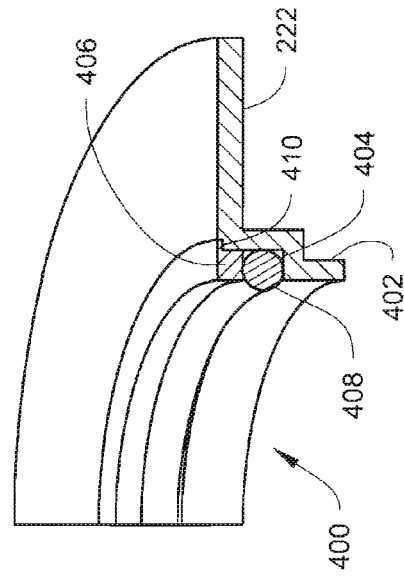
FIG. 7B is another embodiment of a seal configuration for sealing an endplate of an inner filter with a standpipe of a housing.
Figure 7D:
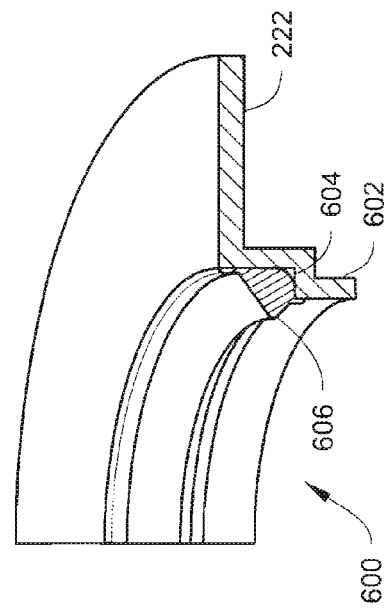
FIG. 7D is yet another embodiment of a seal configuration for sealing an endplate of an inner filter with a standpipe of a housing.
Figure 7A:
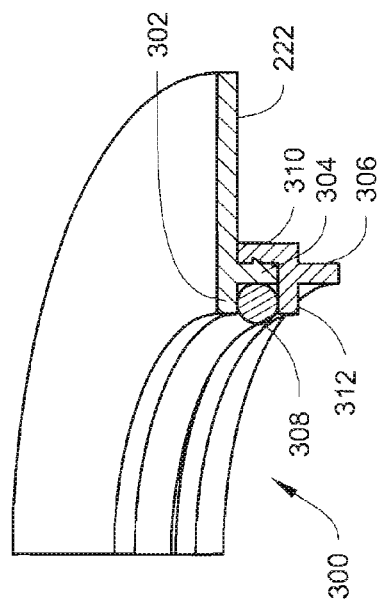
FIG. 7A is one embodiment of a seal configuration for sealing an endplate of an inner filter with a standpipe of a housing.

FIG. 7A shows a gasket seal configuration 300, such but not limited to an o-ring. The endplate structure 222 includes an inner portion 302 proximate the inner diameter and a support 304 extending from the endplate structure 222. A retainer 306 includes a support 312 extending in a generally parallel direction as the inner portion 302, and a flange 310 extending in a generally parallel direction as the support 304. The retainer 306 can be snap-fitted to the endplate structure 222, for example through connection of the flange 310 and an outer diameter of the support 304. In one embodiment, the outer diameter of the support 304 is larger than the inner diameter of the flange 310, so as to allow for the snap-fit engagement. The inner portion 302, inner diameter of the support 304 and the support 312 form a groove to allow an o-ring 308 to be retained therein.

FIG. 7B shows another gasket seal configuration 400, such as but not limited to an o-ring. A retainer 406 retains the o-ring 408 on the second endplate structure 222. Differently from FIG. 7A, the retainer 406 is disposed on top of the o-ring 408 where the endplate structure 222 is modified with a support flange 402 extending from the inner diameter. The support flange 402 includes a step region 404. The step region 404 and the retainer 406 form a groove to retain the o-ring 408. As shown in the embodiment of FIG. 7B, the retainer 406 and the second endplate structure 222 are fitted at a step area 410. In some examples, the retainer 406 is welded with heat during the embedding of the filter media onto the endplate, or by press fitting the retainer 406 onto the endplate.

Figure 7C:
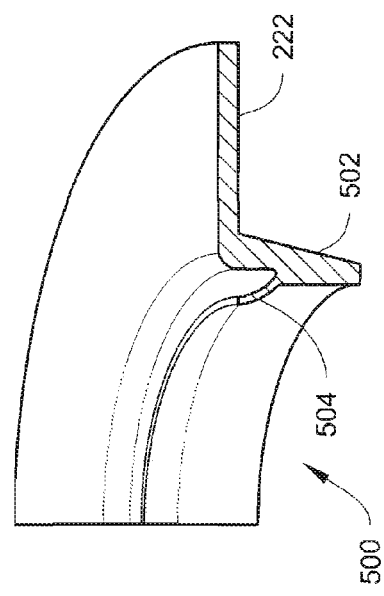
FIG. 7C is another embodiment of a seal configuration for sealing an endplate of an inner filter with a standpipe of a housing.

FIG. 7C shows another seal configuration 500 in the form of a wiper seal 504 on an inner annular flange 502 of the second endplate structure 222. In the example shown, the inner annular flange 502 extends from the inner diameter of the second endplate structure 222 and the wiper seal 504 is formed from the inner annular flange 502. The wiper seal 504 is a relatively flexible flange that can seal the endplate to a standpipe.

FIG. 7D shows another seal configuration 600 as a modified overmold construction. In some examples, the second endplate structure 222 includes a support 602 extending from the inner diameter and has a step 604. An overmold material 606 can be disposed on the step 604 for example by injection molding prior to embedding of the filter media.

It will be appreciated that any of the seal configurations described may also be suitably applied to the outer surface of the first endplate structure as one of skill in the art could accomplish.

With reference to producing a filter cartridge with the endplate structure concepts described herein, a method for forming such an endplate structure includes pouring a heat curing material into a mold. The mold corresponds to an endplate structure of the filter cartridge. An end of an outer filter and an inner filter are embedded into the heat curing material by placing the end of the outer filter and the inner filter into the heat curing material. Placement of the outer filter and inner filter are such that the inner filter is arranged within a central axis of the outer filter, such that there is a space between an inner diameter of the outer filter and an outer diameter of the inner filter, and such that the inner filter having an opening adapted for inserting a filter housing standpipe therein. The heat curing material and the outer filter and inner filter are then cured to form the endplate structure. In accordance with the above descriptions, at least one of a top end and a bottom end of the outer filter and the inner filter is embedded therein.

As described, the heat curing material can be but is not limited to polyurethane.

In some examples, the mold for an endplate structure comprises one endplate for the bottom of the outer filter and another endplate for the bottom of the inner filter (see e.g. FIGS. 1-3). In other examples, the mold for an endplate structure comprises a single endplate for the bottom of each of the outer filter and the inner filter (see e.g. FIGS. 5 and 6). In yet other examples, the mold for an endplate structure comprises a single endplate for the top of each of the outer filter and the inner filter (see e.g. FIGS. 1-6).

As described, both the first and second endplate structures can be formed of the heat cured material. In other embodiments, the method can further include pouring a heat curing material into another mold for the other of the first or second endplate structure. The other end of the top or bottom end of the outer filter and the inner filter is embedded into the heat curing material. The heat curing material and the other end of the top or bottom end of the outer filter and inner filter are then cured, where the other end of the top end or bottom end of the outer filter and the inner filter is embedded therein.

The heat cured material of the endplate structures described herein can provide a filter cartridge that is convenient for manufacture, for example by reducing costs of tooling and providing a more forgiving embedding process given the nature of the heat cured material. The heat cured material of the endplate structures herein also can provide one or more sealing surfaces to seal with a housing that the filter cartridge may be assembled with.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge comprising:
    an outer filter that includes a first filter media, the outer filter including a central axis;
    an inner filter that includes a second filter media, the inner filter is arranged within the central axis of the outer filter, such that there is a space between an inner diameter of the outer filter and an outer diameter of the inner filter, the inner filter having an inner diameter with an opening adapted for inserting a standpipe of a filter housing therein;
    the outer filter and the inner filter having a first endplate structure on a top end of each of the outer filter and the inner filter;
    the outer filter and the inner filter having a second endplate structure on a bottom end of each of the outer filter and the inner filter, the second endplate structure having an opening in fluid communication with the space between the outer filter and the inner filter and having an opening in fluid communication with the opening of the inner filter; and
    at least one of the first endplate structure and the second endplate structure is a heat cured material formed onto the outer filter and the inner filter, such that at least one of the top end and the bottom end of the outer filter and the inner filter are embedded within the heat cured material,
    wherein the second endplate structure includes an inner sealing surface on an inner diameter of the inner filter, and the inner sealing surface includes an overmolded material.

2. The filter cartridge of claim 1, wherein the heat cured material is polyurethane.

3. The filter cartridge of claim 1, wherein the first endplate structure is a single endplate on the top end of the outer filter and the inner filter.

4. The filter cartridge of claim 1, wherein second endplate structure is a single endplate on the bottom end of the outer filter and the inner filter.

5. The filter cartridge of claim 1, wherein the second endplate structure comprises one endplate on the bottom end of the outer filter and another endplate on the bottom end of the inner filter.

6. The filter cartridge of claim 1, the second endplate structure comprising an outer sealing surface on an outer diameter of the outer filter, at least one of the inner and outer sealing surfaces being the heat cured material.

7. The filter cartridge of claim 1, wherein the outer filter and the inner filter have substantially the same height from the top end to the bottom end.

8. The filter cartridge of claim 1, wherein the bottom end of the inner filter is shorter than the bottom end of the outer filter.

9. The filter cartridge of claim 1, wherein the second endplate structure includes a plate portion for receiving the inner filter,
    wherein the inner sealing surface includes a first support portion extending from an inner diameter of the plate portion, a step portion extending from an end of the first support portion away from the plate portion, and a second support portion extending from an end of the step portion away from the first support portion,
    wherein the overmolded material is disposed on the step portion.

* * * * *